United States Patent [19]
Narimatsu et al.

[11] Patent Number: 6,147,812
[45] Date of Patent: Nov. 14, 2000

[54] PROJECTION ZOOM LENS SYSTEM AND PROJECTOR APPARATUS

[75] Inventors: Syuji Narimatsu, Nagano, Japan; Jeffrey A. Gohman, Hillsboro, Oreg.

[73] Assignees: Nittoh Kogaku K.K., Japan; In Focus Systems, Inc., Wilsonville, Oreg.

[21] Appl. No.: 09/363,070

[22] Filed: Jul. 28, 1999

[51] Int. Cl.$^7$ .................................................. G02C 15/14
[52] U.S. Cl. ............................................................ 359/691
[58] Field of Search .................................... 359/691, 676, 359/683, 687

[56] References Cited

U.S. PATENT DOCUMENTS 5,644,435  7/1997  Shikama .................................. 359/691

*Primary Examiner*—Scott J. Sugarman
*Attorney, Agent, or Firm*—Stoel Rives LLP

[57] ABSTRACT

A projection zoom lens system of the present invention for projecting image onto a screen from a light modulator such as a DMD includes a first lens group having a negative refractive power and a second lens group having a positive refractive power arranged in this order from the screen side. An outer diameter LD of the last lens and a back focus at the wide-angle end Bfw of the projection zoom lens system satisfy the condition below.

$$0.3 < LD/Bfw < 0.5 \qquad (A).$$

Further, at least one of surfaces of the last lens is aspheric. Therefore, even though the back focus is long and a diameter of the last lens is small, it is possible to provide a compact projector lens system having excellent optical performance with the only nine lenses arrangement.

6 Claims, 11 Drawing Sheets

PROJECTION ZOOM LENS SYSTEM AND PROJECTOR APPARATUS

BACKGROUND OF INVENTION

1. Technical Field

The present invention relates to a projection zoom lens system of a projector apparatus for projecting a magnified image displayed on a light valve onto a screen.

2. Description of the Related Art

Conventionally, liquid crystal panels have been commonly used as light valves of projectors. In recent years, in place of the liquid crystal panels, the apparatus having a plurality of elements for forming an image by mechanically changing reflecting direction of light, such as microelectromechanical systems have been brought into practical use. One of examples of such apparatus is a DMD (digital mirror device, deformation micro-foil deviceordisplay) in which fine mirror elements (micro mirrors) are arranged into an array in correspondence with pixels for displaying an image by controlling angle of each of the mirrors. A light modulator for generating the pixels by the micro mirrors provides faster response speed and brighter image compared with the LCD and thus, is suitable for providing a compact projector of high-intensity (contrast ratio) and high-quality image.

When generating an image using the DMD, the micro mirror rotates at about ±10° such that effective (on) reflection and ineffective (off) reflection are switched. Therefore, a projector using the DMD as a light valve requires a projector lens system which captures or being into its pupil the effective reflection (effective light or on light) but does not capture the ineffective reflection (ineffective light or off light). Further, in order to minifying the image circle, it is desirable to dispose the projector lens system in the normal direction with respect to the DMD. Therefore, the place for disposing a light source for inputting projection light to the DMD is limited, and in order to input the effective light to the projector lens system from the DMD, it is necessary to dispose the light source in substantially the same direction as the projector lens system.

In the light of above, a projection lens system for a projector apparatus employing the DMD is required to have a small diameter and a long back focus (back focal length) at the light valve side. Generally, in the lens system having a long back focus, the diameter of the lens located rearward tends to become large. However, since the diameter of the rear lens is limited as mentioned above, it is necessary to design the projection lens system such that the position of exit pupil is located in the vicinity of the last (rear) lens.

On the other hand, it is necessary to arrange a large number of lenses so as to enhance the performance of the projection lens system. Disposing a large number of lenses may increase the overall length of the projection lens system to a certain degree. If the overall length of the projection lens system is increased, the diameter of the lens located forward is increased as well in the lens system having the exit pupil located rearward.

A projector apparatus employing the DMD is required to reduce its size and thickness, and the projector lens system is also required to be compact as a whole and to reduce the lens diameter. It is obvious that such a lens system is required to have a sufficiently high aberration performance as the projection lens system. Further, the projection lens system is required to be capable of zooming in addition to satisfy the above-described conditions for the DMD.

It is an object of the present invention to provide a projection lens system, especially a projection zoom lens system suitable for a projector apparatus employing a light modulator, such as DMD, changes reflection directions of light of pixels to form an image. It is an object of the invention to provide a projection zoom lens system having high image-forming performance suitable for the DMD, and to provide a compact projector apparatus employing a light modulator of this type and capable of displaying a bright and high contrast image.

SUMMARY OF THE INVENTION

The present invention provides a projection zoom lens system for projecting, onto a screen, an image from a light modulator such as DMD that includes a plurality of elements for changing a reflection direction of light to generate the image. The projection zoom lens system of this invention includes a first lens group having a negative refractive power and a second lens group having a positive refractive power, arranged in this order from the side of the screen. In addition, at least one of both surfaces of a last lens of the second lens group closest to the light modulator is aspherical surface. Further, an outer diameter LD of the above last lens and a back focus at a wide-angle end Bfw of the projection zoom lens system satisfies the following condition.

$$0.3 < LD/Bfw < 0.5 \tag{A}$$

The projection zoom lens system of the present invention is of a retro focus type which is effective for elongating the back focus. Further, it is suitable for the light modulator such as the DMD that changes the reflection direction of light to form the image, under the condition (A) above, the relation between the back focus Bf and the diameter LD of the last lens.

In addition, by making at least one of both the surfaces of the last lens aspheric to enhance the image-forming performance, this projection lens system has excellent aberration performance with the minimum number of lenses. Reducing the number of lenses decreases not only the cost but also the overall length of the projection lens system. Therefore, it is possible to prevent increase in the diameter of a lens at the screen side (forward lens) in the lens system having the exit pupil located rearward lens (the last lens).

Further, in this projection lens system, the last lens has the smallest diameter for catching the on-light only from DMD. If the surface of the last lens becomes aspheric, the effect of the cost is minimum and maybe reduced by the reduction of the number of lenses. In the projection zoom lens system of the present invention, if LD/Bfw of the condition (A) above is less than the lower limit (0.3), the diameter of the forward lens is increased excessively. Contrary, if LD/Bfw exceeds the upper limit (0.5), the diameter of the last lens is increased excessively, which may capture the ineffective light (off-light) from the light modulator.

The projection zoom lens of the present invention within the condition (A) above is compact in size with high image-forming performance suitable for a light modulator having a plurality of elements by changing the reflection direction of light to form an image. Therefore, the projector apparatus having the projection zoom lens system of the present invention, the light modulator such as a DMD, and a light source system for illuminating on the light modulator is capable of projecting a bright and high contrast image of high resolution taking advantages of the DMD. Further, since the size of the projector lens system is so small, the projector apparatus can also be made compact.

For making this projection zoom lens system more compact and having higher image-forming performance, it is desirable that a focal length (composite or resultant focal length) f1 of the first lens group and a focal length f2 of the second lens group satisfy the following condition (B):

$$0.6<|f2/f1|<1.0 \quad (B).$$

If |f2/f2| is less than the lower limit (0.6), coma aberration at the wide-angle end (wide-angle extremity) is increased, and under this influence, coma flare appears. At the same time, the diameter of the forward lens becomes larger. On the other hand, if |f2/f1| exceeds the upper limit (1.0), coma aberration at the telephoto end (telephoto extremity) is increased and chromatic difference of magnification is also increased. At the same time, a diameter of the last lens becomes larger.

It is also desirable that a focal length f1 of the first lens group and an overall length at the wide-angle end Lw of the projection zoom lens system satisfy the following condition (C):

$$0.3<|f1/Lw|<0.6 \quad (C).$$

This condition also relates to a coma aberration and a lens diameter, and if |f1/Lw| is less than the lower limit (0.3) of this condition (C), the coma aberration at the telephoto end is increased and a coma flare appears. At the same time, this makes a diameter of the last lens larger. On the other hand, if the |f1/Lw| exceeds the upper limit (0.6) of the condition (C), the coma aberration at the wide-angle end is increased, and this increases the diameter of the forward lens.

Further, it is desirable that the first lens group is divided into a front group having a negative refractive power and a rear group having a positive refractive power arranged from the side of the screen in this order. The rear group will be able to dispose in the vicinity of the center of this projection lens system slightly apart from the front group. By positioning the lens groups in the above-described manner, the rear group performs like a field lens and it makes possible to reduce the entire size of the second lens group. Moreover, the rear group is effective for correcting the aberration generated by negative power of the front group. It is desirable that a focal length (composite or resultant focal length) ff1 of the front group and a focal length rf1 of the rear group satisfy the following condition (D):

$$0.2<|ff1/rf1|<0.4 \quad (D).$$

If |ff1/rf1| is less than the lower limit (0.2), the coma aberration at the wide-angle end is increased and a coma flare appears. At the same time, this increases the diameter of the last lens. On the other hand, if the |ff1/rf1| exceeds the upper limit (0.4) of the condition (D), the coma aberration at the telephoto end is increased, and this increases the diameter of the forward lens.

It is also important that the focal length f1 of the first lens group, an overall length at the telephoto end Lt of the projection zoom lens system, and a back focus at the telephoto end Bft satisfy the following condition (E):

$$0.2<|f1/(Lt+Bft)|<0.5 \quad (E).$$

If |f1/(Lt+Bft)| is beyond the lower limit (0.2) or the upper limit (0.5), the appropriate relationship between, at the telephoto end, the overall length and the power of the first lens group becomes out of balance. Therefore, the factor beyond the condition (E), the overall length of the lens at the telephoto end becomes larger. Further, the power of the first lens group becomes excessively reduced and aberration will be large. For this reason, it becomes extremely difficult to correct the aberration generated in the first lens group by the second lens group.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DESCRIPTION OF THE PREFERRED EMBODIMENTS

Figure 1:
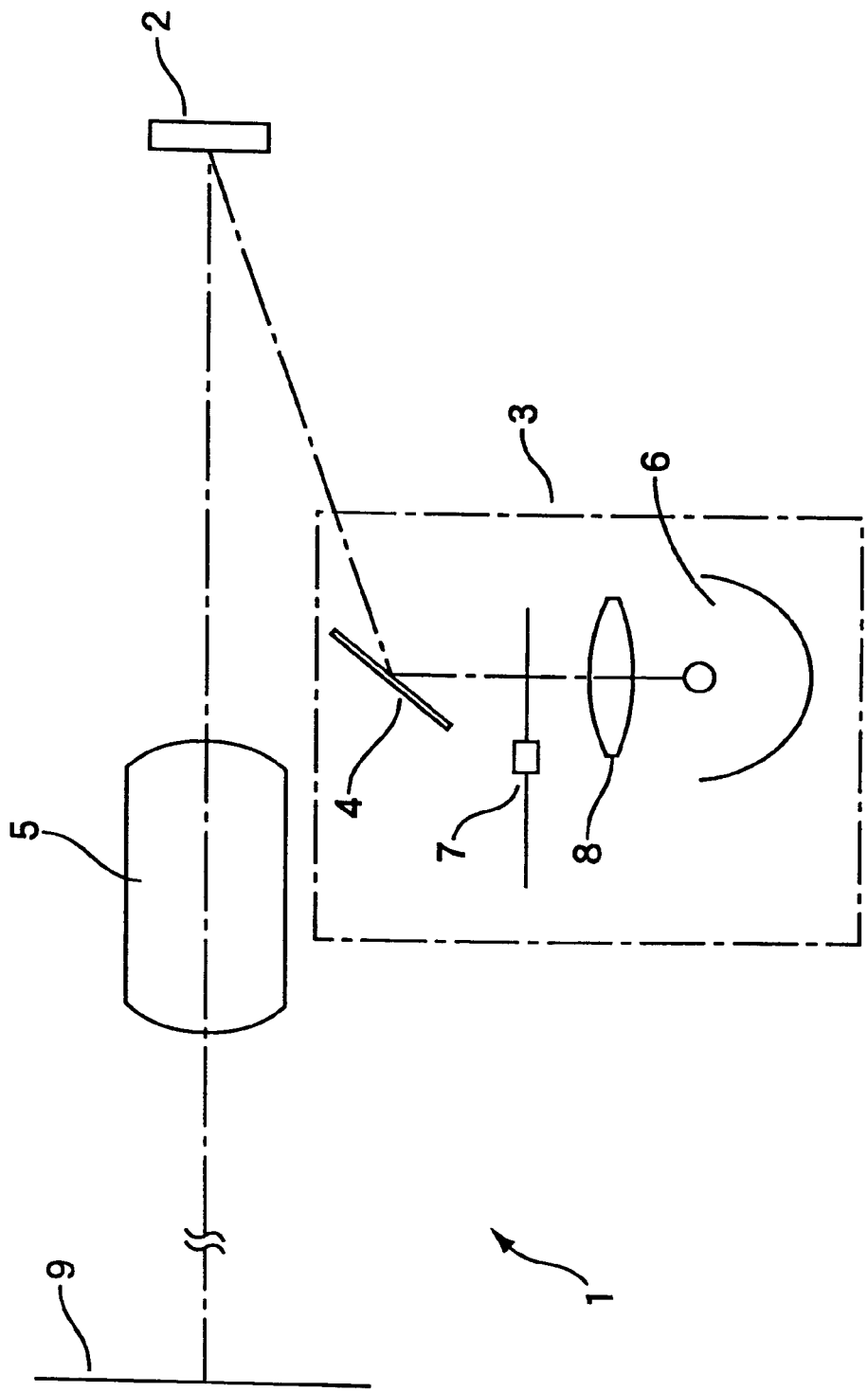
FIG. 1 shows a schematic configuration of a projector apparatus according to the present invention.

FIG. 1 shows an example of a projection system (projector or projector apparatus) according to the present invention. The projector 1 includes a DMD 2 which is a light modulator (light valve), a light irradiation system (light source system) 3 for illuminating or irradiating projection light to the DMD and a projection lens system 5 for projecting effective light reflected by the DMD 2 onto a screen 9. The projector 1 shown in FIG. 1 is a single-plate type video projector, and the light source system 3 includes a white light source 6 such as a halogen lamp, and a disc type rotating color separation filter 7. From the light source system 6, the three primary colors, i.e., red, green and blue are supplied to the DMD 2 in a time dividing manner. A color image is generated by the DMD and displayed by controlling elements corresponding to respective pixels of the DMD according to the timing of respective color lights.

The light source system 3 is further provided, as required, with optical elements such as a condenser lens 8 and a mirror 4 for condensing light from the light source 6 or bringing the light into parallel light according to the location or structure of various projectors. If the normal of the DMD 2 and the optical axis of the projection lens system 5 coincide with each other, the image circle becomes smaller, thus decreasing the diameter of the projection lens system. As described above, it also becomes easy to separate effective light (on-light) and ineffective light (off-light) from each other. Therefore, an incident angle from the light source system 3 to the DMD 2 is limited, and the light axis of the light source system 3 and the light axis of the projection lens system 5 are directed substantially in the same direction. In order to prevent the influence from the light irradiation system 3 to the projection zoom lens system 5 or to the projection image, it is necessary to elongate the back focus of the projection lens system 5 to a certain extent. Further, it is necessary to sufficiently reduce the diameter of the last lens of the projection lens system 5 located closer to the DMD 2 to cut the off-light therefrom.

Embodiment 1

Figure 2:
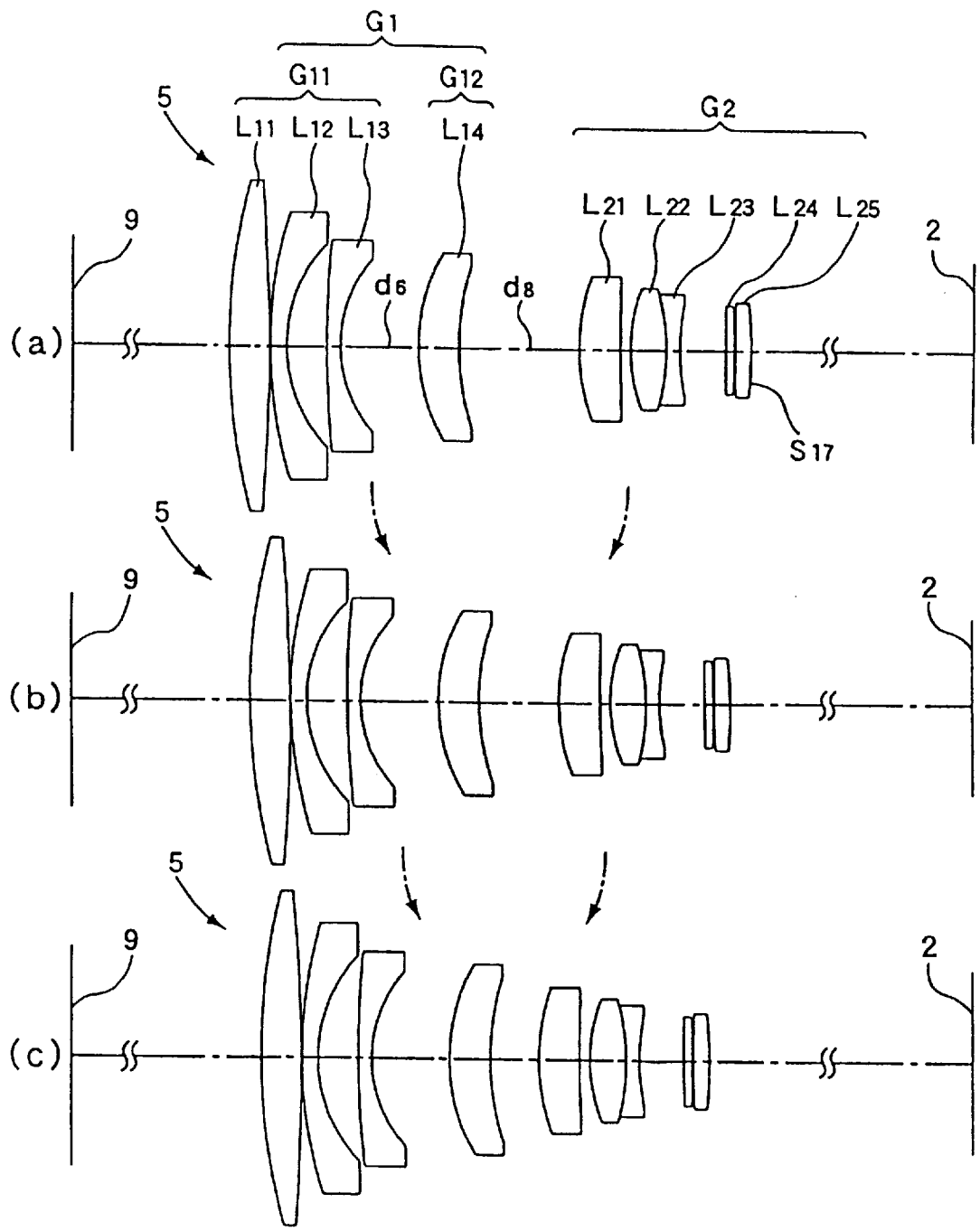
FIG. 2 is a schematic view showing a configuration of a projection zoom lens system according to Embodiment 1 of this invention, and shows positions of lenses at the wide-angle end (a), the telephoto end (c), and medium (b)

FIG. 2 shows a projection zoom lens system 5 according to the present invention. FIG. 2(*a*) shows positions of lenses constituting the projection zoom lens system 5 at a wide-angle end (extremity) corresponding to the state for magnifying and displaying. FIG. 2(*c*) shows that of at a telephoto end which correspond to a standard state. FIG. 2(*b*) shows that of at medium state between the foregoing two states. The projection zoom lens system 5 of the present embodiment includes nine lenses L11 to L25 which are divided into first and second lens groups G1 and G2 from the side of the screen 9. The details of each lens are listed below. The first lens group G1 located at the side of the screen 9 is a lens group having negative refractive power as a whole. The first lens group G1 includes a front group Gil having negative power (refractive power) located at the side of the screen 9, and a rear group G12 having positive power located at substantially the center of the projection zoom lens system 5 at a distance d6 apart from the front group G11.

The front group G11 has an arrangement of, from the side of screen 9 (hereinafter screen side), a biconvex positive lens L11 which is the forward or front lens, a screen side convex negative meniscus lens L12, and a screen side convex negative meniscus lens L13. The rear group G12 is made up of an arrangement of single lens that is a screen side convex positive meniscus lens L14.

The second lens group G2 located closer to the DMD 2 has an arrangement of, from the screen side, a screen side convex a positive meniscus lens L21, a biconvex positive lens L22, a biconcave negative lens L23 forming a doublet with the lens L22, a screen side concave (DMD side convex) positive meniscus lens L24, and a biconvex positive lens L25. A surface S17 facing the DMD 2 of the lens L25 which is the last or rear lens of the second lens group G2 and closest to the DMD 2 is aspheric. A distance d8 between the second lens group G2 and the first lens group G1 is adjustable so as to provide image-forming characteristics between the range from wide-angle to telephoto ends by reducing the distance d8.

In lens data shown below;

ri is the radius of curvature (mm) of each of the lenses arranged sequentially from the screen side;

di is the distance (mm) between the adjacent lens surfaces arranged sequentially from the screen side;

ni is the refractive rate (d line) of the lens arranged sequentially from the screen side;

vi is the Abbe number (d line) of the lens arranged sequentially from the screen side;

f is the focal length (composite or resultant focal length and the same for the following focal lengths) of the projection zoom lens system 5

Bf is the back focus (mm) ("Bfw" is the back focus at the wide-angle end, "Bft" is the back focus at the telephoto end);

FNo is the F number;

f1 is the focal length (mm) of the first lens group G1;

f2 is the focal length (mm) of the second lens group G2;

ff1 is the focal length (mm) of the front group G11;

rf1 is the focal length (mm) of the rear group G12;

Lw is the overall length (mm) of the projection lens system 5 at the wide-angle end;

Lt is the overall length (mm) of the projection lens system at the telephoto end; and LD is the lens diameter (mm) of the last lens L25.

| | | Lens Data (No.1) | | | |
|---|---|---|---|---|---|
| i | ri | di | ni | vi | note |
| 1 | 123.397 | 7.400 | 1.48749 | 70.4 | lens L11 |
| 2 | −388.514 | 0.200 | | | |
| 3 | 85.872 | 3.000 | 1.62041 | 60.3 | lens L12 |
| 4 | 27.199 | 7.500 | | | |
| 5 | 186.689 | 2.500 | 1.65844 | 50.9 | lens L13 |
| 6 | 24.165 | 14.400 | | | |
| 7 | 33.870 | 7.700 | 1.84666 | 23.8 | lens L14 |
| 8 | 46.711 | d8 | | | |
| 9 | 37.772 | 7.500 | 1.74950 | 35.0 | lens L21 |
| 10 | 263.808 | 1.900 | | | |
| 11 | 29.994 | 6.700 | 1.67790 | 55.5 | lens L22 |
| 12 | −42.031 | 2.500 | 1.84666 | 23.8 | lens L23 |
| 13 | 40.226 | 8.400 | | | |
| 14 | −580.749 | 1.500 | 1.84666 | 23.8 | lens L24 |
| 15 | −127.520 | 0.160 | | | |
| 16 | 221.468 | 2.900 | 1.58913 | 61.3 | lens L25 |
| 17 | −80.965 | ASPHERIC | | | |

| State | f | d8 | Bf | F No. |
|---|---|---|---|---|
| Wide angle | 27.3 | 22.664 | 40.892 | 3.0 |
| Medium | | 15.164 | 44.504 | |
| Telephoto | 35.6 | 9.333 | 48.165 | 3.5 |

The lens distance d8 indicates the value obtained when an image was formed at a position 3 m apart from the front end of the lens system 5.

The surface s17 of the lens L25 is aspheric, and its aspheric coefficient is as follows:

K=0.0000

A=0.125238×10$^{-4}$, B=0.128014×10$^{-6}$

C=−0.209841×10$^{-8}$, D=0.155831×10$^{-10}$

Wherein the equation of the aspherical surface is below.

$$x=(y^2/r)/[1+\{1-(1+K)(y^2/r^2)\}^{1/2}]+Ay^4+By^6+Cy^8+Dy^{10}$$

Various values (mm) of the projection zoom lens system of the present embodiment are as follows:

f1 = −42.763,      f2 = 36.978
ff1 = −29.236,      rf1 = 114.130

-continued

| | |
|---|---|
| Bfw = 40.797, | Bft = 47.955 |
| Lw = 96.924, | Lt = 83.593 |
| LD = 15.800 | |

Therefore, parameters defined in the above conditions (A) to (E) are as follows:

| | |
|---|---|
| condition (A) | LD/Bfw = 0.387 |
| condition (B) | \|f2/f1\| = 0.865 |
| condition (C) | \|f1/Lw\| = 0.441 |
| condition (D) | \|ft1/rf1\| = 0.256 |
| condition (E) | \|f1/(Lt + Bft)\| = 0.325 |

The projection zoom lens system 5 of the present embodiment is a kind of the retro focus type zoom lens in which the negative power first lens group G1 and the positive power second lens group are combined and it is easy to elongate the back focus. Therefore, it is possible to provide a sufficient back focus of 40 mm or longer at the wide-angle end. Further, in order not to capture the ineffective light from the DMD, a diameter LD of the last lens is 15.8 mm, which is extremely small. The projection zoom lens system 5 satisfies the condition (A), therefore, the back focus Bf is long, and the diameter LD of the last lens is small. In such a projection lens system, if the overall length becomes long, the diameter of the forward lens is likely to be relatively large. However, in this embodiment, since the aspheric surface is employed on the last lens L25, the excellent aberration performance as described later using nine lenses in total. Therefore, the overall length of this lens system at the wide-angle end is extremely short about 97 mm, and it makes the diameter of the forward lens L11 smaller about 60 mm.

Further, although the projection zoom lens system 5 of the present embodiment is compact in size, it is possible to zoom up to 1.3 times magnification. Also this projection zoom lens system 5 is a bright and wide zoom lens having the F-number of 3.0–3.5 and the focal length short enough range from 27.3 to 35.6 mm. Furthermore, the projection zoom lens system 5 of the embodiment is designed to satisfy the conditions of the above (B) to (E) also. In addition, the first lens group G1 is divided into the front group G11 and the rear group G12, the rear group G12 is disposed at a distance from the front group G11 so that the aberration of the front group G11 is moderated or corrected by the rear group G12. Therefore, even though the projection lens system consists of only nine lenses, aberration is well corrected and aberration performance is extremely excellent as the projection lens system as shown in the followings.

Figure 3:
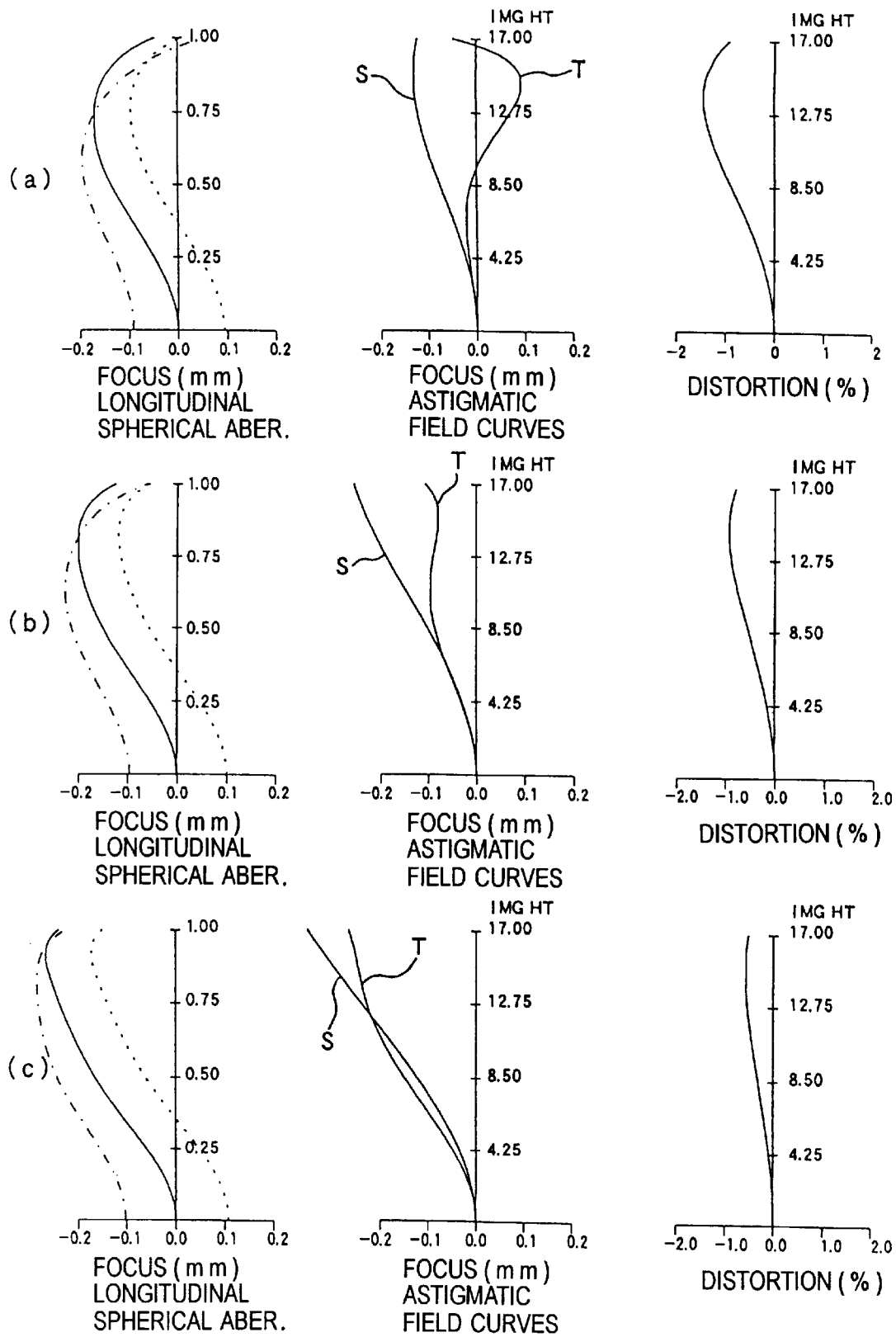
FIG. 3 shows vertical aberration of the projection zoom lens system of the first embodiment, and shows aberration at the wide-angle end (a), the telephoto end (c), and medium (b)
Figure 4:
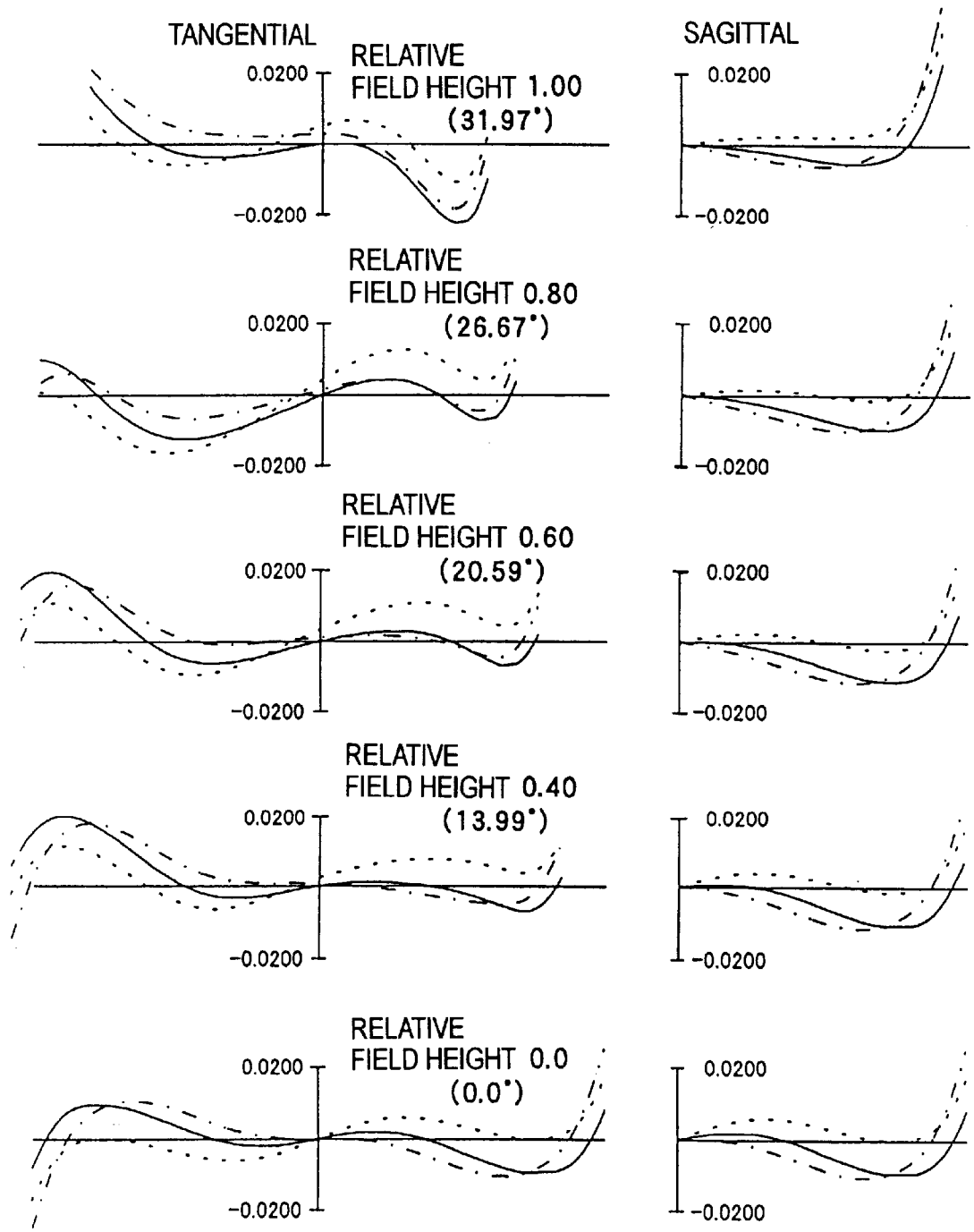
FIG. 4 shows lateral aberration of the projection zoom lens system of the first embodiment at the wide-angle end.
Figure 5:
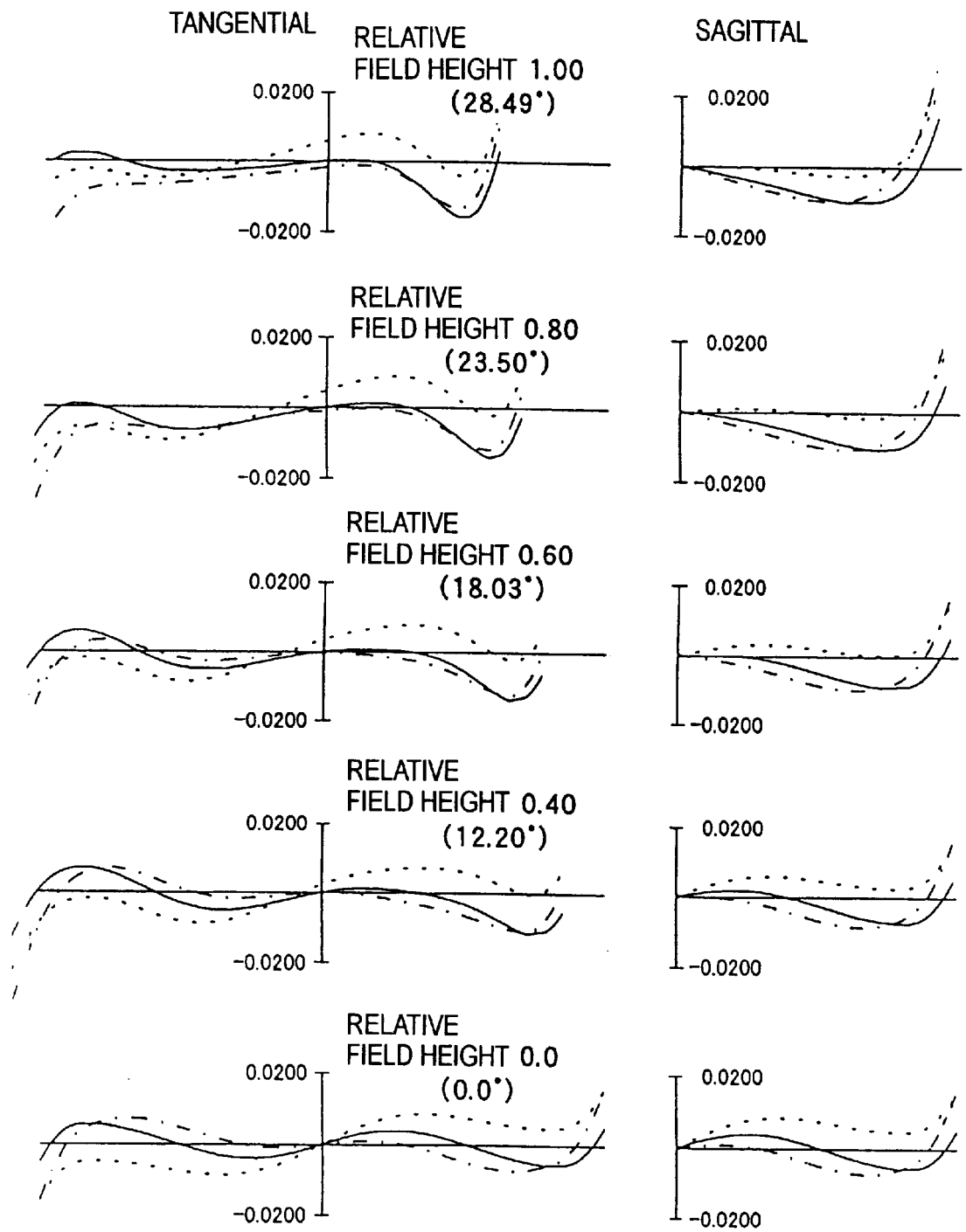
FIG. 5 shows lateral aberration of the projection zoom lens system of the first embodiment at the medium.
Figure 6:
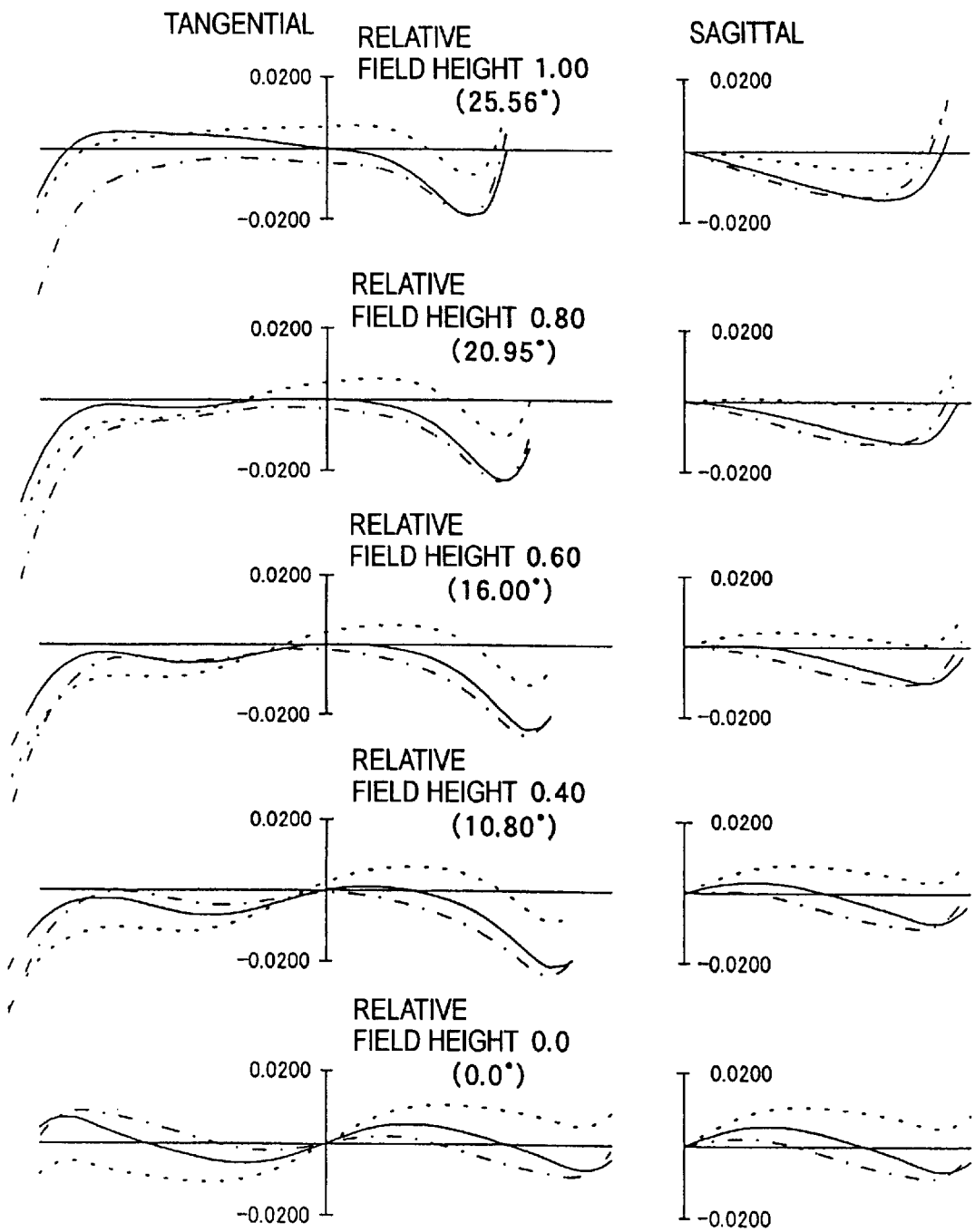
FIG. 6 shows lateral aberration of the projection zoom lens system of the first embodiment at the telephoto end.

FIG. 3 shows spherical aberration, astigmatic aberration and distortion at the wide-angle end (a), the telephoto end (c) and the medium state (b) of this projection zoom lens system. FIG. 4 to FIG. 6 show lateral spherical aberration at the wide-angle end (FIG. 4), the telephoto end (FIG. 6) and the medium state (FIG. 5). The spherical aberration is shown by the aberrations of wavelength of 656.0 nm (broken line), 587.0 nm (solid line) and 450.0 nm (dot-dash line). The astigmatic aberration and the lateral aberration are shown by the aberrations of tangential beam and sagittal beam respectively.

As shown in these figures, the vertical aberration of the projection zoom lens system 5 of the present embodiment is in a range of about ±0.2 mm from the wide-angle end to the telephoto end. This aberration performance level is equal to or higher than that of a high-performance zoom lens system consists of about ten lenses or more having telecentric incidence side that is suitable for the projector employing a crystal panel as the light valve. That is the aberration performance of the projection zoom lens system of the present embodiment is extremely excellent.

Further, the lateral aberration is in a range of about ±0.02 mm from the wide-angle end to the telephoto end. Accordingly, the lateral aberration performance of this lens system is also extremely excellent and no flare (coma flare) due to influence of coma aberration will be observed.

As described above, the projection zoom lens system 5 of the present embodiment not only satisfies conditions for projecting an image formed by DMD 2 onto a screen but also it is allowed to have zooming function and extremely excellent image-forming performance. Further, the overall length is so short and the diameter of the projection lens system is small. Therefore, by incorporating the projection zoom lens system 5 of the present embodiment, it is possible to provide the compact projector 1 capable of projecting a bright and high-resolution image on the screen taking advantage of characteristics of the DMD 2.

Further, the number of lenses constituting this projection zoom lens is as small as only nine, and the last lens L25 is aspheric lens but its diameter is smallest. Therefore, it is possible to reduce the cost of the projection lens system 5, and it is effective for reducing the cost of the projector 1.

Embodiment 2

Figure 7:
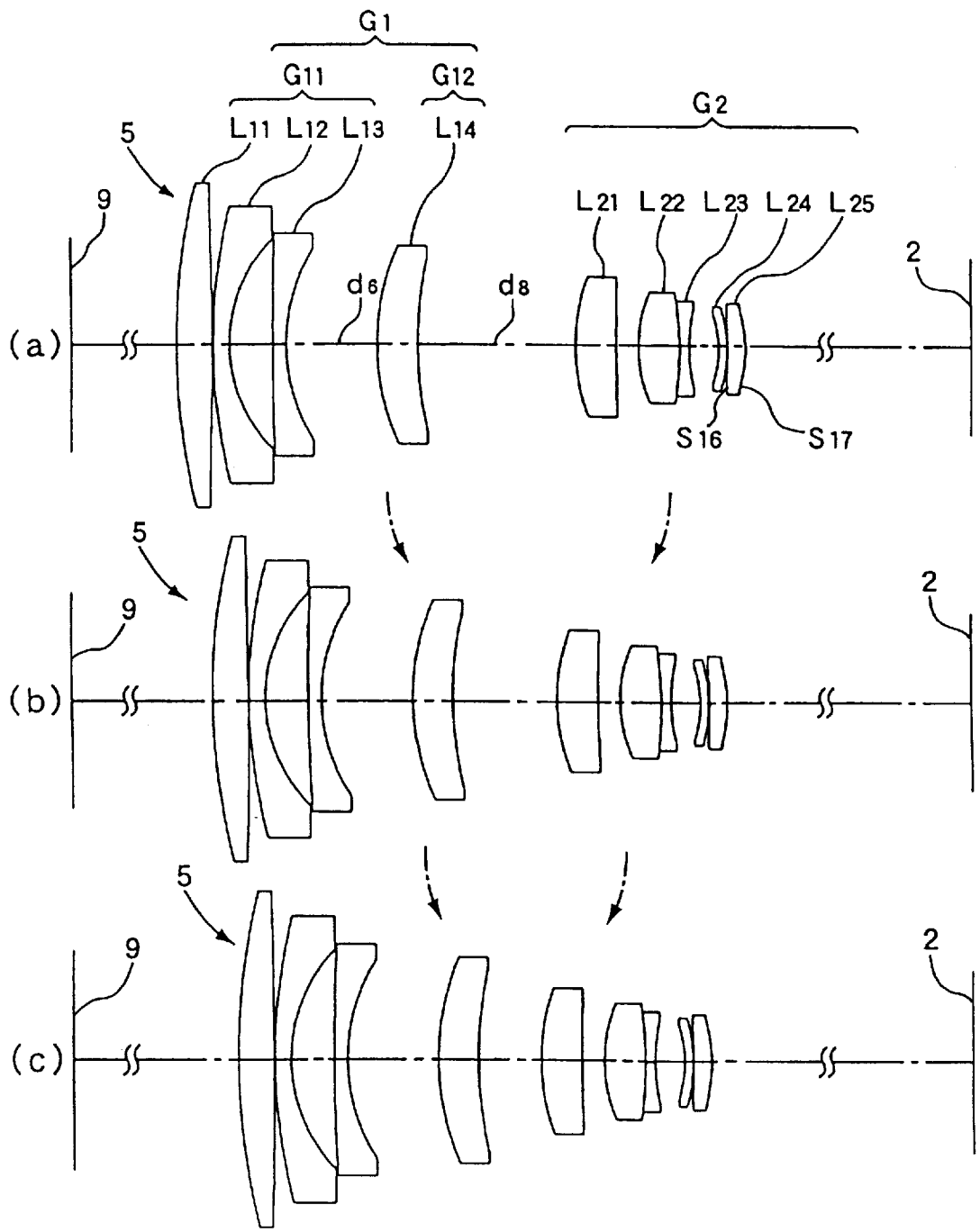
FIG. 7 is a schematic view showing a configuration of a projection zoom lens system according to Embodiment 2 of this invention at the wide-angle end (a), the telephoto end (c), and medium (b)

FIG. 7 shows an another embodiment of the projection zoom lens system according to the present invention. The zoom lens 5 of this embodiment also has two lens groups, i.e., a negative refractive power first group G1 and a positive refractive power second lens group G2. The first lens group G1 is a combination of a front group G11 and a rear group G12. The projection zoom lens system 5 is also constituted by nine lenses L11 to L25, and the type of each lenses are the same as those of the first embodiment. In this embodiment, both surfaces of the last lens L25 of the zoom lens 5 are aspheric so as to increase the correction ability for further improving the aberration.

The lens data of the present embodiment are shown below. The symbols are the same as those of the first embodiment.

Lens Data (No.2)

| i | ri | di | ni | vi | note |
|---|---|---|---|---|---|
| 1 | 127.629 | 6.600 | 1.51680 | 64.2 | lens L11 |
| 2 | −1228.955 | 0.200 | | | |
| 3 | 107.097 | 3.000 | 1.67003 | 47.2 | lens L12 |
| 4 | 28.797 | 8.000 | | | |
| 5 | 417.360 | 2.500 | 1.58913 | 61.3 | lens L13 |
| 6 | 34.252 | 16.900 | | | |
| 7 | 46.073 | 7.600 | 1.80518 | 25.5 | lens L14 |
| 8 | 71.751 | d8 | | | |
| 9 | 38.521 | 7.500 | 1.74330 | 49.2 | lens L21 |
| 10 | 321.347 | 4.100 | | | |
| 11 | 27.528 | 7.500 | 1.67790 | 55.5 | lens L22 |
| 12 | −80.526 | 1.800 | 1.80518 | 25.5 | lens L23 |
| 13 | 33.720 | 5.400 | | | |
| 14 | −23.066 | 1.500 | 1.74400 | 44.9 | lens L24 |
| 15 | −30.715 | 0.160 | | | |
| 16 | −101.516 | ASPHERIC | 1.58913 | 61.3 | lens L25 |
| 17 | −27.420 | ASPHERIC | | | |

| State | f | d8 | Bf | F No. |
|---|---|---|---|---|
| Wide-angle | 27.3 | 29.738 | 41.089 | 3.0 |
| Medium | | 19.722 | 44.384 | |
| Telephoto | 35.6 | 11.934 | 47.738 | 3.5 |

In the present embodiment, like the first embodiment, the lens distance d8 is the value obtained when an image was formed at a position 3 m apart from the front end of the lens.

The surfaces s16 and s17 of the lens L25 are aspherical surface, their aspheric equation is the same as in the first embodiment and the aspheric coefficients of each surface are as follows.

Surface s16, K=0.0000
$A=0.264697\times10^{-5}$, $B=0.211011\times10-6$
$C=0.119969\times10^{-8}$, $D=0.116216\times10^{-10}$
Surface s17, K=0.0000
$A=0.206378\times10-4$, $B=0.223512\times10^{-6}$
$C=0.493887\times10^{-9}$, $D=0.166774\times10^{-10}$ Various numeric values of this projection zoom lens system are as follows:

| | |
|---|---|
| f1 = −52.424 | f2 = 40.283 |
| ff1 = −34.778 | rf1 = 141.240 |
| Bfw = 41.090 | Bft = 47.676 |
| Lw = 105.798 | Lt = 87.994 |
| LD = 15.800 | |

Therefore, the above conditions (A) to (E) are as follows:

condition (A) LD/Bfw=0.385 condition (B) |f2/f1|=0.768 condition (C) |f1/Lw|=0.4955 condition (D) |f1/rf1|=0.246 condition (E) |f1/(Lt+Bft)|=0.386

The projection zoom lens system 5 of the present embodiment also has a sufficient back focus of 40 mm or longer at the wide-angle end and the diameter LD of the last lens is 15.8 mm small enough for DMD. The overall length of this projection lens system is about 106 mm at the wide-angle end and is slightly longer than that of the embodiment 1, but the overall length of this lens system is still sufficiently short as the projection lens system. In addition, the diameter of the forward lens L11 is as small as about 60 mm. Thus, the projection lens system of the present embodiment is also the very compact zoom lens. Further this projection zoom lens system 5 is designed so as to satisfy the conditions of the above-explained conditions (A) to (E), and both the surfaces of the last lens L25 are aspheric. Therefore, aberration is well corrected and optical performance is extremely excellent as the projection lens system as shown in the following figures.

Figure 8:
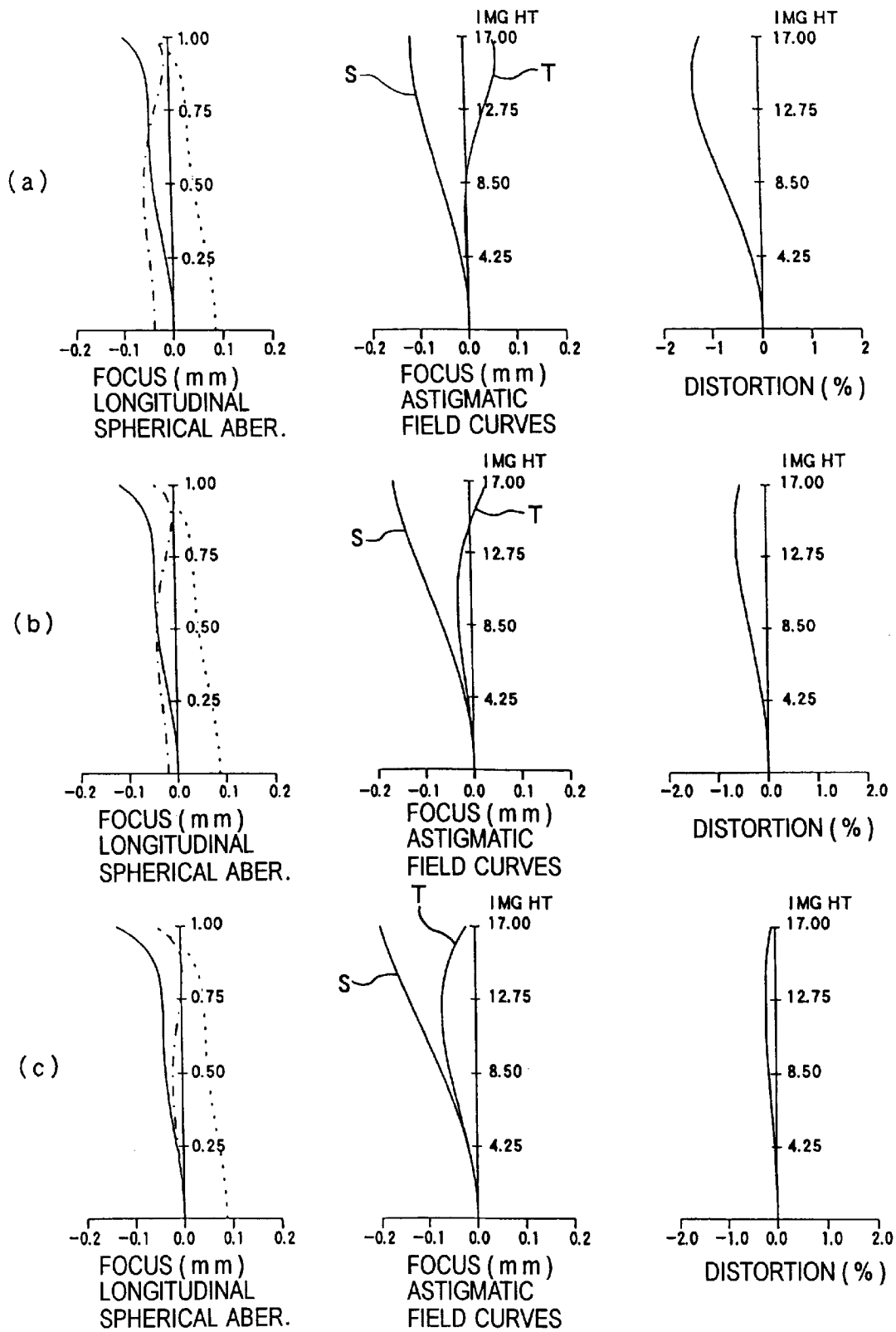
FIG. 8 shows vertical aberration of the projection zoom lens system of the second embodiment, and shows aberration at the wide-angle end (a), the telephoto end (c), and the medium (b)
Figure 9:
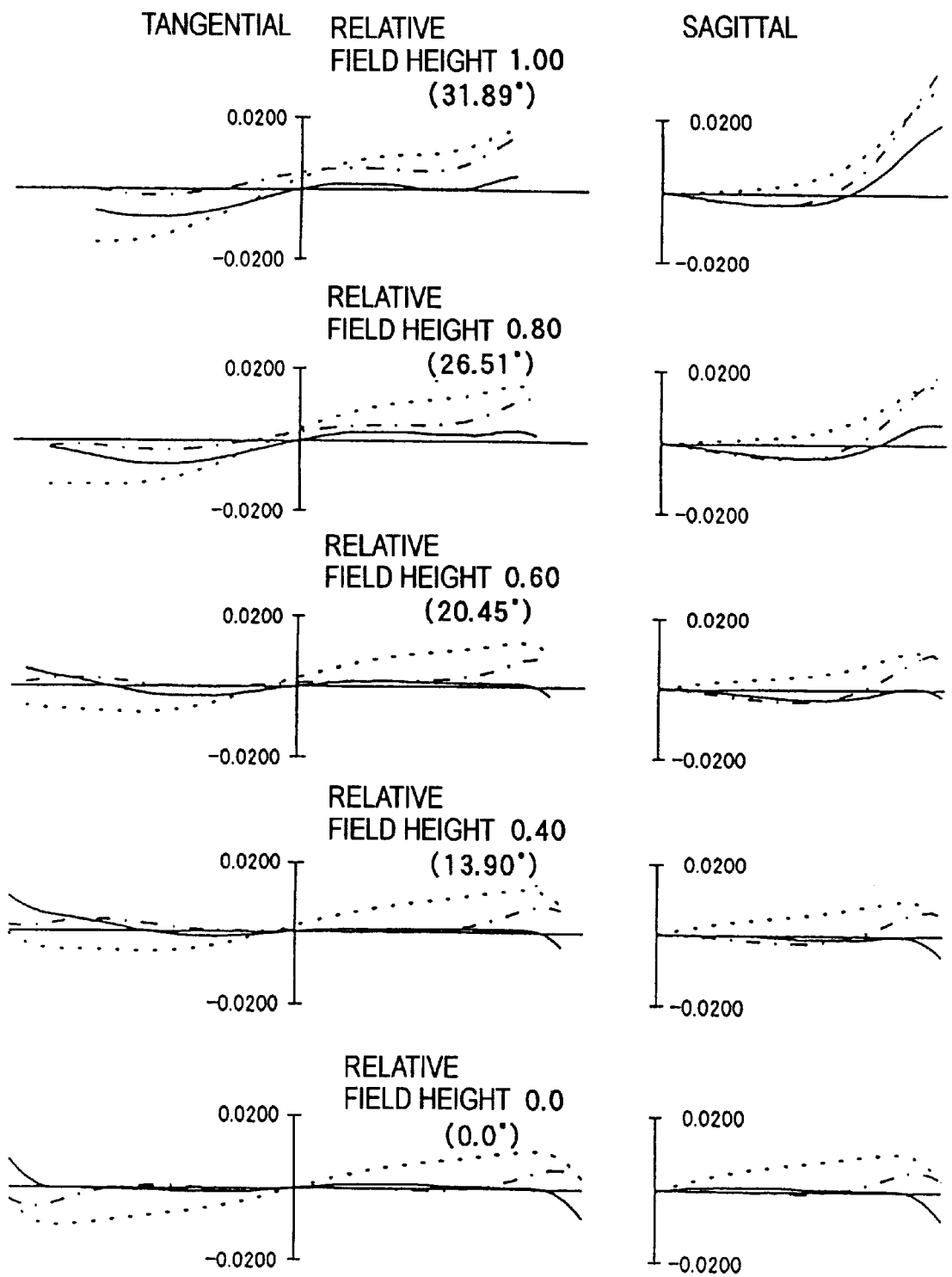
FIG. 9 shows lateral aberration of the projection zoom lens system of the second embodiment at the wide-angle end.
Figure 10:
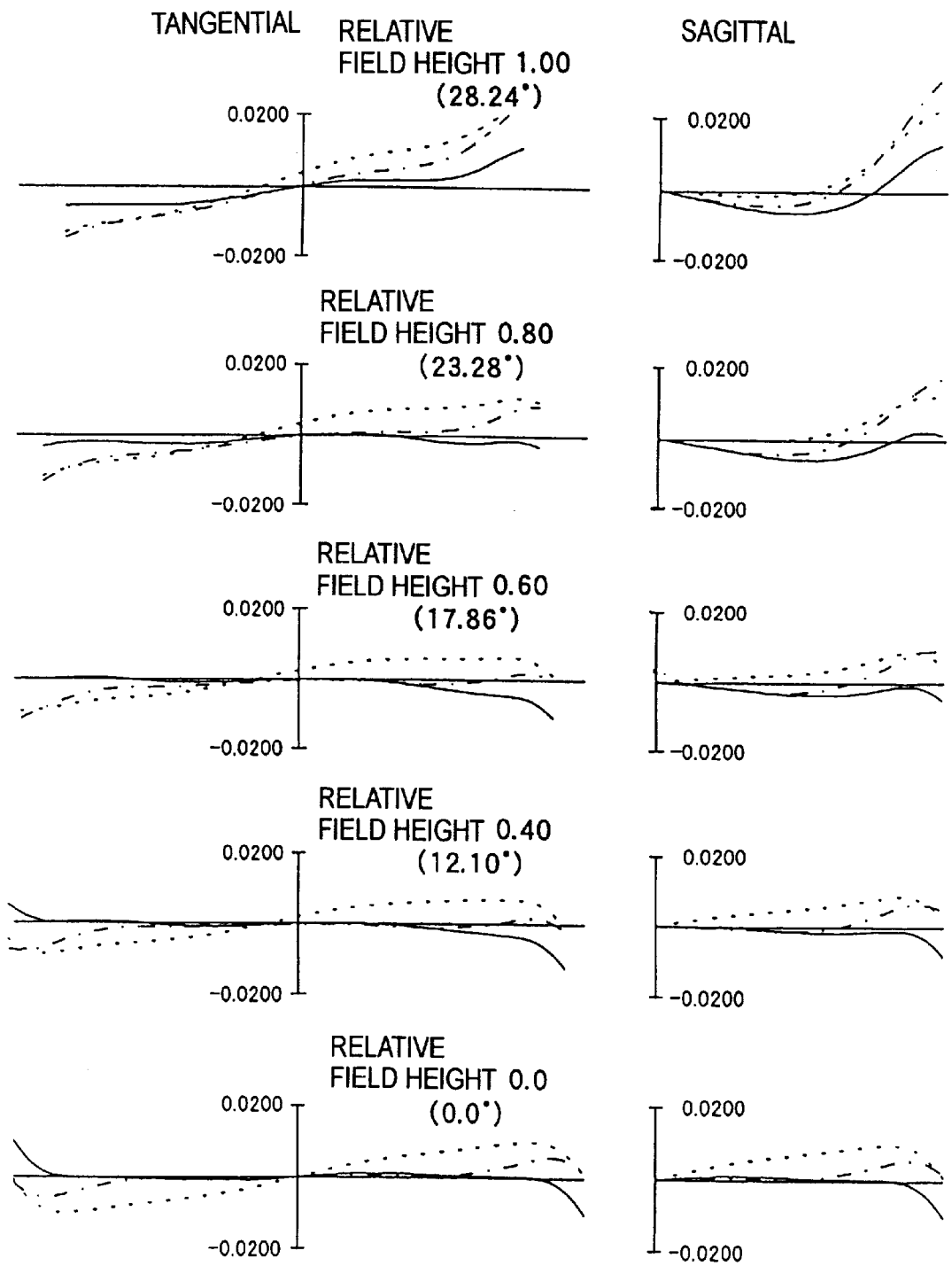
FIG. 10 shows lateral aberration of the projection zoom lens system of the second embodiment at the medium.
Figure 11:
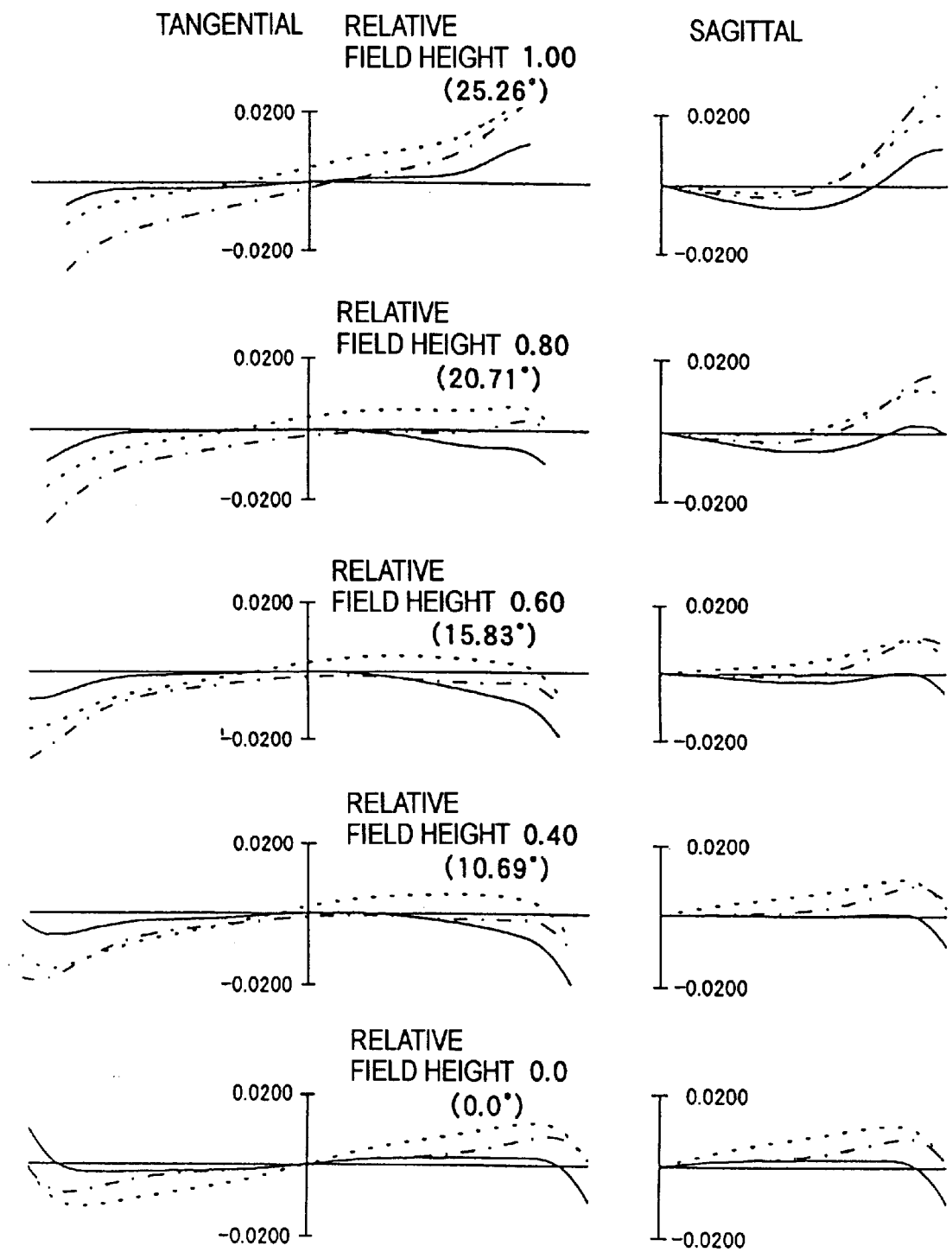
FIG. 11 shows lateral aberration of the projection zoom lens system of the second embodiment at the telephoto end.

FIG. 8 shows spherical aberration, astigmatic aberration and distortion at the wide-angle end (a), the telephoto end (c) and the medium state (b) of this embodiment. FIGS. 9 to 11 show lateral spherical aberration at the wide-angle end (FIG. 9), the telephoto end (FIG. 11) and the medium portion (FIG. 10). Descriptions of the respective aberration diagrams are the same as those of the above-explained embodiment 1.

As shown in these drawings, the vertical aberration of the projection zoom lens system 5 of the present embodiment is in a range of about ±0.1 mm from the wide-angle end to the telephoto end. Therefore, it may be said that the projection zoom lens system 5 of the present embodiment has better aberration performance than that of the high-performance projection zoom lens system shown in the previous embodiment. Further, the lateral aberration is in a range of about ±0.01 mm from the wide-angle end to the telephoto end. Therefore, the lateral aberration performance becomes also better than that of the previous embodiment.

The object of the present invention is to disclose optimal conditions of a projection zoom lens system suitable for a projector using a light modulator for reflecting light, such as DMD, to form an image having a long back focus and small diameter of the last lens. As shown in the above embodiments, we can provide the projection zoom lens system sufficiently satisfies the object of this invention.

That is, the projection zoom lens system of the present invention is suitable for elongating the back focus by the simple structure of negative and positive two lens groups arranged sequentially from the screen side. In addition, the present zoom lens system is so compact and having high image-forming performance by satisfying the condition (A) and by making at least one surface of the last lens aspheric. Further, in this invention, it is possible to provide the projection zoom lens system having more excellent performance by satisfying the additional conditions (B) to (E) disclosed in the above. Therefore, by this invention, it is possible to provide the projection zoom lens system being, in addition to the above features, a wide-angle zoom lens with a shorter focal length having smaller distortion aberration, smaller chromatic difference of magnification, and smaller coma flare.

Especially, in this invention, high performance and low cost projection zoom lens for DMD projector can be provided by the only nine lenses arrangement and its performance is equal to or higher than that of the costly telecentric type zoom lens for a LCD projector by ten or more lenses arrangement. Since DMD has a quick response speed and can provide a high-contrast image, it is considered that the DMD will be widely and rapidly employed as a light valve of the projector in place of LCD in the near future. The projection zoom lens system of the present invention is most suitable for the DMD and it is possible to provide a high-performance, compact and inexpensive projector by employing the projection zoom lens system of the present invention.

Various other modifications will be apparent to and can be readily made by those skilled in the art without departing from the scope and spirit of this invention.

What is claimed is:

1. A projection zoom lens system for projecting an image onto a screen from a light modulator that includes a plurality of elements for changing a reflection direction of light to generate the image, said projection zoom lens system comprising a first lens group having a negative refractive power and a second lens group having a positive refractive power, arranged in this order from the side of said screen, wherein at least one of both surfaces of a last lens of said second lens group that is closest to said light modulator is aspheric, and wherein an outer diameter LD of said last lens and a back focus at a wide-angle end Bfw of said projection zoom lens system satisfy the following condition:

0.3<LD/Bfw<0.5.

2. A projection zoom lens system according to claim 1, wherein a focal length f1 of said first lens group and a focal length f2 of said second lens group satisfy the following condition:

0.6<|f2/f1|<1.0.

3. A projection zoom lens system according to claim 1, wherein a focal length f1 of said first lens group and an overall length at the wide-angle end Lw of said projection zoom lens system satisfy the following condition:

$$0.3 < |f1/Lw| < 0.6.$$

4. A projection zoom lens system according to claim 1, wherein said first lens group comprises a front group having a negative refractive power and a rear group having a positive refractive power, arranged from the side of said screen in this order, and a focal length ff1 of said front group and a focal length rf1 of said rear group satisfy the following condition:

$$0.2 < |ff1/rf1| < 0.4.$$

5. A projection zoom lens system according to claim 1, wherein a focal length f1 of said first lens group, an overall length Lt at a telephoto end of said projection zoom lens system, and a back focus at the telephoto end Bft satisfy the following condition:

$$0.2 < |f1/(Lt+Bft)| < 0.5.$$

6. A projector apparatus comprising said projection zoom lens system of claim 1, said light modulator and a light source system for illuminating said light modulator.

* * * * *

UNITED STATES PATENT AND TRADEMARK OFFICE
CERTIFICATE OF CORRECTION

PATENT NO. : 6,147,812
DATED : November 14, 2000
INVENTOR(S) : Syuji Narimatsu and Jeffrey A. Gohman It is certified that error appears in the above-identified patent and that said Letters Patent is hereby corrected as shown below:

Column 1,
Line 17, "deviceordisplay" should read -- device or display --.

Column 3,
Line 6, "|f2/f2|" should read -- |f1/f2| --.

Column 5,
Line 33, "Gil" should read -- G11 --.

Column 7,
Line 14, "ft1" should read -- ff1 --.

Column 9,
Line 38, "condition (D) | fl/rf1 | = 0.246" should read -- condition (D) | ff1/rf1 | = 0.246 --.

Signed and Sealed this

Twenty-first Day of January, 2003

JAMES E. ROGAN
*Director of the United States Patent and Trademark Office*